Feb. 4, 1930.                G. RECHTER                1,746,090
ROPE END CONNECTER AND ADJUSTER
Filed April 18, 1929
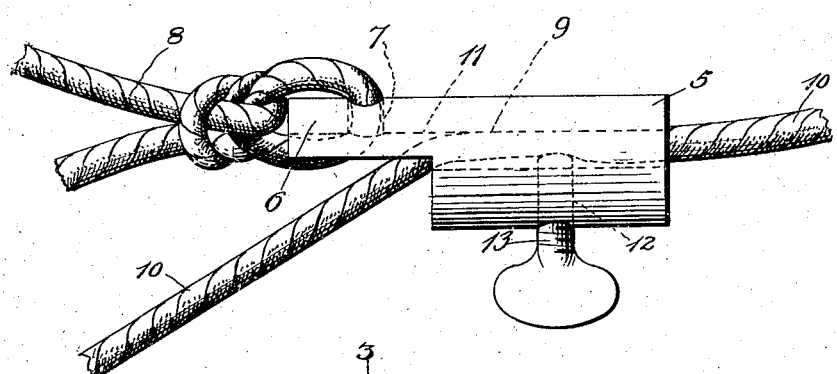
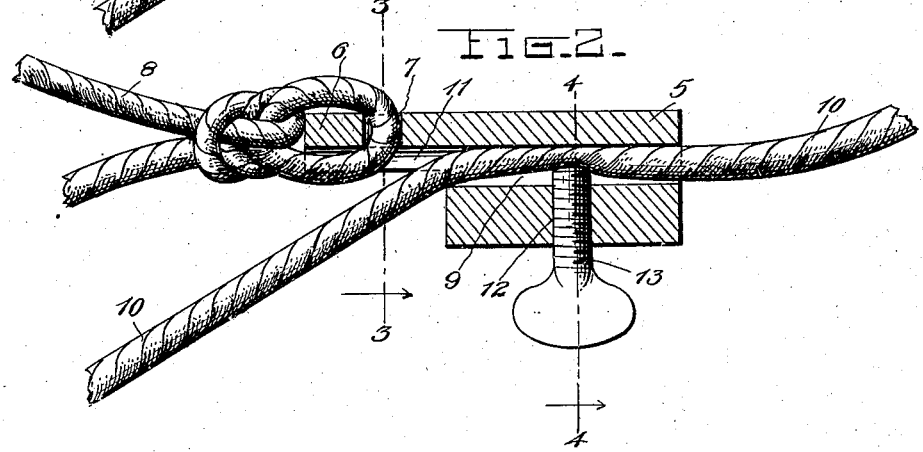
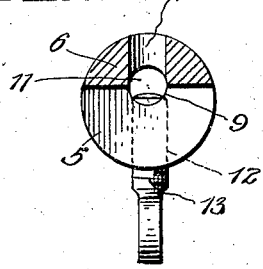 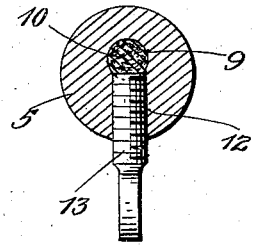
Inventor
George Rechter
By H. B. Willson & Co.
Attorneys
Witnesses
E. Hunt.

Patented Feb. 4, 1930

1,746,090

UNITED STATES PATENT OFFICE

GEORGE RECHTER, OF SAN FRANCISCO, CALIFORNIA

ROPE-END CONNECTER AND ADJUSTER

Application filed April 18, 1929. Serial No. 356,072.

The invention relates to a connecting device for rope ends and to one of such nature as to be readily adaptable for relatively adjusting said ends to effect tightening of the rope when desired, and the principal use of the device is in connection with clothes lines, but it will be understood that it is not restricted to this field.

The object of the invention is to provide an exceptionally simple and inexpensive yet an easily operable, efficient and generally desirable article.

With the foregoing in view, the invention resides in the novel subject matter hereinafter described and claimed, description being accomplished by reference to the accompanying drawing.

Fig. 1 is a side elevation.

Fig. 2 is a central longitudinal sectional view.

Figs. 3 and 4 are transverse sectional views on the correspondingly numbered lines of Fig. 2, the rope being omitted in Fig. 3.

In the drawing above briefly described, the numeral 5 denotes a one-piece, elongated, cylindrical body preferably of about two inches in length by substantially one inch in diameter. At one of its ends, body 5 is provided with an integral longitudinally projecting lug 6 which is disposed at one side of the axis of said body, said lug being preferably of about one inch in length. The periphery of the lug 6 is provided with the same curvature as the periphery of the body 5, presenting a smooth exterior. Lug 6 is provided from its exterior to its interior with an opening 7 in which a rope end 8 may be suitably anchored. Body 5 is provided from end to end with a rope-receiving bore 9 for another rope end 10, said bore continuing in the form of a groove 11 along the inner side of the lug 6, said groove being in communication with the opening 7. The side of the body 5 opposite the lug 6, is formed with a radial opening 12 of a diameter substantially equal to that of the bore 9, and the latter is preferably disposed closer to the lug side of the body than to the opposite side thereof to give more length to the opening 12 through which a rope clamping screw 13 is threaded for tightly clamping the rope end 10 in the bore 9. By making provision for having the opening 12 rather long, there is less liability of the screw threads therein becoming stripped from repeated use.

By providing the unique construction shown and described, the article may be easily and inexpensively manufactured and hence sold at small cost. The device may be quickly and easily engaged with the rope ends as shown on the drawing and when the desired tightness has been obtained, the set screw 13 is tightened to clamp the rope end 10 in the bore 9. Any time further tightening is desired, or adjustment of any other nature, loosening of the screw 13 will permit necessary sliding of the rope end 10 through the bore to effect the requisite adjustment, after which said end may be tightly held by again tightening said screw.

The details disclosed are preferably followed but within the scope of the invention as claimed, minor variations may be made.

I claim:—

A rope connecter and adjuster comprising a one-piece elongated cylindrical body provided at one end with an integral longitudinally projecting lug disposed at one side of the longitudinal axis of said body, said lug having a rope anchoring opening, said body being formed with a rope-receiving bore from end to end and continuing in the form of a groove along the inner side of said lug, said groove communicating with said rope anchoring opening, said body being provided with a radial opening from its exterior to said bore and of substantially the same diameter as the latter, and a set screw threaded through this opening for clamping a rope in said bore.

In testimony whereof I have hereunto affixed my signature.

GEORGE RECHTER.